No. 765,279. PATENTED JULY 19, 1904.
C. HEART.
WHEEL.
APPLICATION FILED MAR. 14, 1904.
NO MODEL.
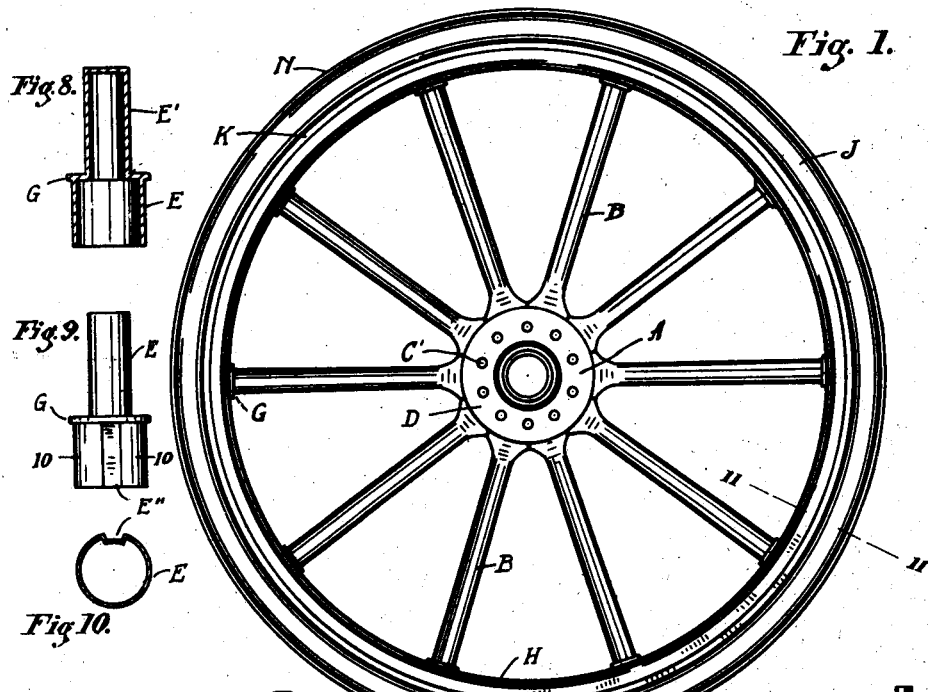
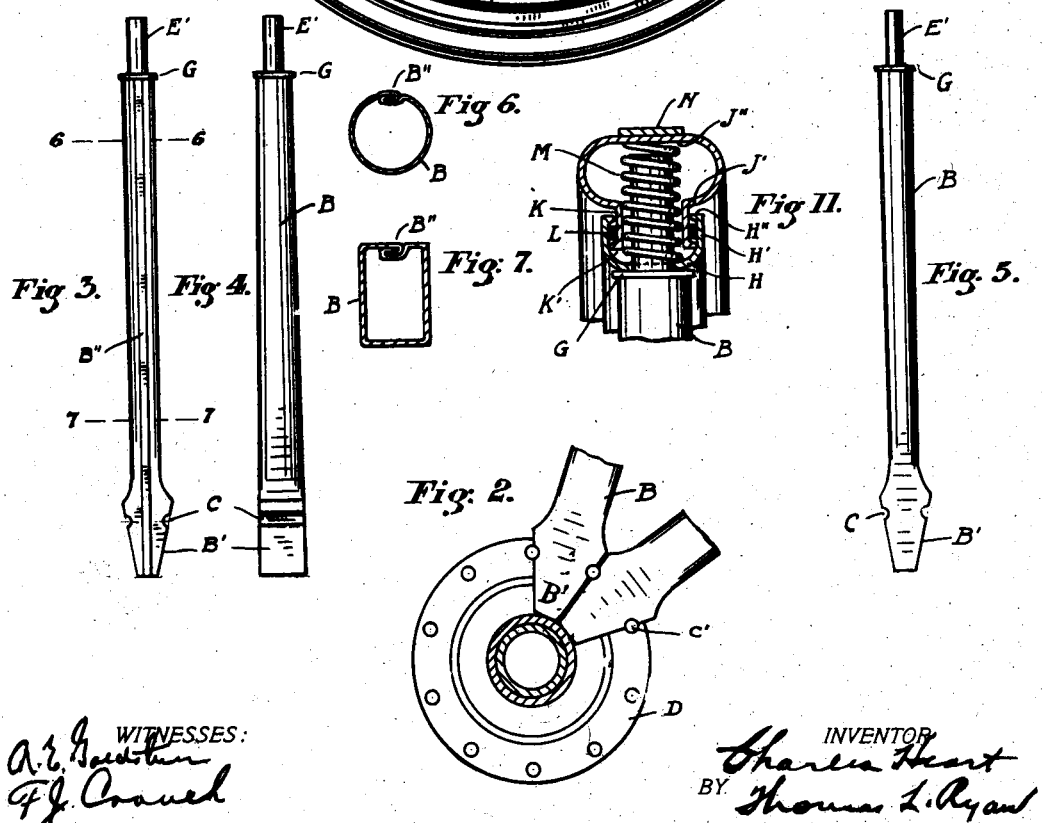
WITNESSES:
INVENTOR
Charles Heart
BY Thomas L. Ryan
ATTORNEY.

No. 765,279. Patented July 19, 1904.

UNITED STATES PATENT OFFICE.

CHARLES HEART, OF ALEXANDRIA, INDIANA.

WHEEL.

SPECIFICATION forming part of Letters Patent No. 765,279, dated July 19, 1904.

Application filed March 14, 1904. Serial No. 197,925. (No model.)

*To all whom it may concern:*

Be it known that I, CHARLES HEART, a citizen of the United States, and a resident of Alexandria, in the county of Madison and State of Indiana, have invented a new and useful Wheel, of which the following is a specification.

The aim and purpose of this invention is to construct a wheel made wholly of metal.

A further object is to construct a wheel which will be light and at the same time strong enough to withstand all wear and tear of ordinary usage.

Another object of this invention is to construct a wheel wherein the parts can be easily assembled and firmly secured together after being assembled.

These and other objects not hereinbefore mentioned are accomplished by the construction illustrated in the accompanying drawings, wherein like letters of reference indicate corresponding parts in the several views, and in which—

Figure 1 is a side elevation of my improved wheel. Fig. 2 is a section through the hub, showing the manner of securing the inner ends of the spokes in place. Figs. 3, 4, and 5 are views of spokes with heads in position. Fig. 6 is a section on line 6 6, Fig. 3. Fig. 7 is a section on line 7 7, Fig. 3. Fig. 8 is a longitudinal section of head of spoke. Fig. 9 is a side elevation of head of spoke. Fig. 10 is a cross-section on the line 10 10, Fig. 9. Fig. 11 is a section through the felly, rim, and tire on the line 11 11, Fig. 1.

In the drawings, A designates the hub. The hub is the same in construction as that secured by Letters Patent for wheel-hub, No. 662,721, dated November 27, 1900, so that a detailed description of it will not be necessary in this application.

B designates the spokes. The inner ends of the spokes are formed wedge-shaped, as shown more plainly at B', Fig. 2. The spokes are constructed of sheet metal, each being made from one piece with a longitudinal seam, as shown at B'', Fig. 3, and are provided with transverse grooves C, through which pass the bolts C'. The ends of these securing-bolts C' are secured to the flanges D on the hub. The outer ends of the spokes are provided with the head E, having projection E'. The construction of head E is shown plainly in Fig. 9 and Fig. 10, in which the longitudinal groove E'' is shown, and which groove permits the insertion of head E into the spoke in assembling the wheel and which locks same firmly into position.

H designates the felly. I prefer to make the felly continuous, although I do not desire to limit myself, as it is evident it may be made of sections. As plainly shown in Fig. 11, the felly is substantially U-shaped in cross-section, and hollowed out, so as to lighten its weight and provide proper opening for the rim J, and is provided with the walls H', having the flat-surfaced lips H''. The outer ends of the spokes are provided with the heads E, with projections E', as shown in Fig. 8, which projections extend upward within and through the felly, as shown in Fig. 11. The head E, provided with the annular shoulder G, is so formed, as plainly shown in Fig. 9, that it fits closely into the outer end of the spoke, and the shoulder G provides ample bearing for the felly and imparts to the wheel a finished appearance.

Resting contiguously to the felly H is the rim J. This rim is a continuous annular oval-shaped open metal tube in cross-section provided with vertical walls K, having outwardly-extending lips K', adapted to bear against the inner walls H' of the felly H. The rim is free to move inwardly and outwardly within the distance between the lips H'' of the felly and portion J' of the rim. Filling the space between the rim-walls K and the felly-walls H' is placed a continuous annular band of rubber L, which prevents rattle of the rim against the felly and also prevents the entry of dust or foreign substances into the wheel.

Situated on the projections of the heads of the spokes, with their inner ends bearing against the felly and their outer ends bearing against the rim, are the strong coil-springs M, the purpose of which springs is to force the rim outwardly uniformly from the felly and to maintain sufficient pressure against the inner side of the rim at J'' to prevent too free movement inwardly and outwardly of the rim and to diminish the shock of impact transmitted from the rim-surfaces J' to the lips H" of the felly when the wheel under a load is in operation. Another object attained in the use of the coil-springs M is that under a load as the wheel moves forward on an inclined surface the distance from the center of the wheel to its periphery is lessened in such manner that the maximum distance from the center to the periphery of the wheel is always to the rear of the axle of the wheel instead of in front and at the rear of the same.

The upper edges of the felly are formed with the flat-surfaced lips H", as shown in Fig. 11, and the portion J' of the rims adapted to bear upon the flat surfaces of the felly is also formed flat and horizontal, so that there is formed a complementary bearing-surface between the rim and upper edges of the felly which will be flat and at right angles to the longitudinal axes of the spokes. By this construction a bearing-surface is obtained whereby such weight as is transmitted from the axle of the wheel is transmitted to the periphery of the wheel from the annular shoulder G of the spoke through the surfaces of the felly and to the rim. I secure to the rim by shrinking the ordinary flat metallic tire N, as shown in Fig. 1 and Fig. 11.

In the construction of this wheel the projection of the head E of the spoke is of such length as not to come into contact with the inner surface of the rim when the surfaces J' of the rim are in contact with the felly-surfaces H". By this construction I make the projection E' of the spoke a guide and holder for the coil-spring M, which so fills the space between the walls K of the rim that the projection E' and spring surrounding it serve as a brace and stiffener and to hold the rim in true position to the felly, thus preventing longitudinal and lateral creeping and preventing wearing unequally the surfaces of the rim and tire.

In assembling the parts the rubber band L is first placed in its proper position on the walls of the rim J. The springs M are then placed in proper position to receive the spoke ends E', after which the felly is sprung into position. The spokes are then placed with their ends B' in the hub, where they are forced securely into position and firmly wedged, forcing the shoulders G of the spokes against the felly, and thereby tightening the felly in place. The portions of the hub are then secured into position.

I am aware that many minor changes can be made in the construction and arrangement of the parts without in the least departing from the nature and principles of my invention.

Having thus described my invention, what I claim as new, and desire to secure by Letters Patent, is—

1. In a wheel, the combination with a metallic felly pressed into a substantially U-shaped form in cross-section, of spokes extending into the interior of the felly and rim, the ends of the spokes being out of contact with the rim, the spokes each being formed of a single piece of sheet metal, each with a single longitudinal seam, the ends of the spokes being provided with heads having annular shoulders outside the felly adapted to bear against the outside of the lower portion of the felly surrounding the spokes, and with means to support flexible connection and to flexibly connect the felly to the rim.

2. In a wheel, the combination with a metallic felly pressed into substantially U-shaped form in cross-section, of a continuous independent oval-shaped rim with projecting vertical walls in cross-section, the projecting vertical walls of the rim positioned independently within the walls of the felly, the outer edges of the felly and the meeting points of the rim being formed horizontal and complementary and means for forcing the rim outwardly from the felly uniformly, and means for filling the spaces between the walls of the felly and the walls of the rim.

In testimony whereof I have hereunto set my hand in the presence of two witnesses.

CHARLES HEART.

Witnesses:
 O. O. BOXELL,
 C. A. HEILMAN.